(12) United States Patent
Shuai et al.

(10) Patent No.: US 12,133,179 B2
(45) Date of Patent: Oct. 29, 2024

(54) TRANSMIT POWER ALLOCATION METHOD, NETWORK DEVICE, AND STORAGE MEDIUM

(71) Applicant: HUAWEI TECHNOLOGIES CO., LTD., Shenzhen (CN)

(72) Inventors: Dan Shuai, Shanghai (CN); Yongzhao Cao, Shenzhen (CN); Huiwu Shi, Shenzhen (CN); Bingqin Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 440 days.

(21) Appl. No.: 17/680,901

(22) Filed: Feb. 25, 2022

(65) Prior Publication Data

US 2022/0256478 A1 Aug. 11, 2022

Related U.S. Application Data

(63) Continuation of application No. PCT/CN2020/112128, filed on Aug. 28, 2020.

(30) Foreign Application Priority Data

Aug. 30, 2019 (CN) .......................... 201910817614.1

(51) Int. Cl.
*H04W 52/30* (2009.01)
*H04W 72/044* (2023.01)

(52) U.S. Cl.
CPC ....... *H04W 52/30* (2013.01); *H04W 72/0473* (2013.01)

(58) Field of Classification Search
CPC .......................... H04W 52/30; H04W 72/0473
See application file for complete search history.

(56) References Cited

U.S. PATENT DOCUMENTS

2009/0010185 A1  1/2009  Li et al.
2012/0190402 A1  7/2012  Whang et al.
(Continued)

FOREIGN PATENT DOCUMENTS

CN    101053170 A    10/2007
CN    101582707 A    11/2009
(Continued)

OTHER PUBLICATIONS

International Search Report issued in corresponding International Application No. PCT/CN2020/112128, dated Nov. 27, 2020, pp. 1-9.

(Continued)

*Primary Examiner* — Raymond S Dean
(74) *Attorney, Agent, or Firm* — HAUPTMAN HAM, LLP

(57) ABSTRACT

A transmit power allocation method includes determining, at a current resource location, a first target band within coverage of a network device. A transmit power for executing a service on the first target band is less than a transmit power allocated to the first target band. The first target band is one of a plurality of bands within the coverage of the network device. The method also includes allocating, to a second target band, at least a part of the transmit power allocated to the first target band. The second target band is within the coverage of the network device and different from the first target band. At the current resource location, a total transmit power allocated within the coverage of the network device is less than or equal to an electromagnetic field (EMF) transmit power of the network device.

20 Claims, 7 Drawing Sheets

(56) References Cited

U.S. PATENT DOCUMENTS

| | | |
|---|---|---|
| 2012/0257519 A1 | 10/2012 | Frank et al. |
| 2013/0023305 A1 | 1/2013 | Shi et al. |
| 2013/0115997 A1 | 5/2013 | Immonen et al. |
| 2014/0146907 A1* | 5/2014 | Kim .................. H04W 72/23 |
| | | 375/267 |
| 2016/0072538 A1 | 3/2016 | Niemi |
| 2016/0255622 A1 | 9/2016 | Xiong et al. |
| 2017/0273028 A1* | 9/2017 | Medina Acosta ..... H04W 76/27 |
| 2017/0289984 A1* | 10/2017 | Baligh .................. H04L 1/08 |
| 2019/0182716 A1* | 6/2019 | Futaki ................ H04W 76/10 |
| 2019/0320339 A1* | 10/2019 | Laselva ............. H04W 52/246 |
| 2019/0320396 A1* | 10/2019 | Bagheri ............. H04W 52/34 |

FOREIGN PATENT DOCUMENTS

| | | |
|---|---|---|
| CN | 101808396 A | 8/2010 |
| CN | 101969646 A | 2/2011 |
| CN | 102595421 A | 7/2012 |
| CN | 102714850 A | 10/2012 |
| CN | 104955157 A | 9/2015 |
| CN | 105009651 A | 10/2015 |
| CN | 106549742 A | 3/2017 |
| CN | 107708211 A | 2/2018 |
| CN | 107846727 A | 3/2018 |
| CN | 108141825 A | 6/2018 |
| EP | 2410802 A1 | 1/2012 |
| EP | 2429249 A1 | 3/2012 |
| KR | 20180072406 A | 6/2018 |

OTHER PUBLICATIONS

Chinese Office Action issued in corresponding Chinese Application No. 201910817614.1, dated Jun. 23, 2021, pp. 1-10.
Japanese Office Action issued in corresponding Japanese Application No. 2022-513338, dated Mar. 13, 2023, pp. 1-20.
Extended European Search Report issued in corresponding European Application No. 20856769.3, dated Sep. 22, 2022, pp. 1-6.
Chinese Notice of Allowance issued in corresponding Chinese Application No. 201910817614.1, dated Apr. 22, 2022, pp. 1-5.

* cited by examiner

TRANSMIT POWER ALLOCATION METHOD, NETWORK DEVICE, AND STORAGE MEDIUM

CROSS-REFERENCE TO RELATED APPLICATIONS

This application is a continuation of International Application No. PCT/CN2020/112128, filed on Aug. 28, 2020, which claims priority to Chinese Patent Application No. 201910817614.1, filed on Aug. 30, 2019. The disclosures of the aforementioned applications are incorporated herein by reference in these entireties.

TECHNICAL FIELD

This application relates to the field of communication technologies, and in particular, to a transmit power allocation method that is based on an electromagnetic field, a network device, and a storage medium.

BACKGROUND

To protect human health, an electromagnetic field (EMF) is specifically regulated globally. With multi-band deployment, remaining transmit power headroom of a network device is limited (where a specific value of the remaining transmit power headroom is affected by a height of the network device, a distance between the network device and a security zone, and the like).

If a new band needs to be deployed within coverage of the network device, maximum transmit power within the coverage of the network device is first determined based on an EMF regulation requirement. Then, transmit power of a band deployed by the network device is subtracted from the maximum transmit power of the network device, and remaining power is maximum transmit power of the new band that needs to be deployed within the coverage of the network device.

It can be learned that in a conventional technology, power allocation to bands within the coverage of the network device is fixed. When the maximum transmit power within the coverage of the network device is limited, power of one or more bands deployed by the network device is bound to be limited. Consequently, a coverage hole occurs in the limited band, and utilization efficiency of transmit power of bands deployed by the network device is reduced.

SUMMARY

This application provides a transmit power allocation method that is based on an electromagnetic field, a network device, and a storage medium, to effectively improve utilization efficiency of transmit power of the network device.

A first aspect of embodiments of this aspect provides a transmit power allocation method that is based on an electromagnetic field. The method includes: determining, at a current resource location, a first target band within coverage of a network device, where transmit power required for executing a service on the first target band is less than transmit power allocated to the first target band, and the first target band is one of a plurality of bands within the coverage of the network device; and allocating, to a second target band, at least a part of the transmit power allocated to the first target band, where the second target band is a band that is within the coverage of the network device and that is different from the first target band, and at the current resource location, total transmit power allocated within the coverage of the network device is less than or equal to electromagnetic field EMF transmit power of the network device.

It can be learned that, according to the method shown in this aspect, the network device can allocate, at the current resource location, transmit power based on a transmit power requirement of the first target band within the coverage of the network device, to implement refined allocation of transmit power on each band, so that there is not unused remaining transmit power on the band, transmit power resource utilization within the coverage of the network device is effectively improved, transmit power used by the network device is effectively improved, and the coverage of network device is improved.

Based on the first aspect of the embodiments of this aspect, in an optional implementation of the first aspect of the embodiments of this aspect, the current resource location is one of the following: at least one radio frame, at least one subframe, at least one slot, or at least one symbol.

It can be learned that, in the method shown in this aspect, transmit power can be allocated at each current resource location to the first target band and the second target band within the coverage of the network device, so that refined allocation of transmit power on each band is implemented, and a waste of remaining transmit power in each band is avoided.

Based on the first aspect of the embodiments of this aspect, in an optional implementation of the first aspect of the embodiments of this aspect, the allocating, to a second target band, at least a part of the transmit power allocated to the first target band includes: A value of the transmit power allocated to the second target band is positively correlated with a service parameter of the second target band, where the service parameter includes at least one of the following: a service volume, a service type, a user type, and transmit power required for scheduling a mid-far point user or a near point user.

It can be learned that, by using the method shown in this embodiment, when the network device determines that at least the part of the transmit power of the first target band needs to be allocated to the second target band, the network device may determine, based on the service parameter of the second target band, a value of the transmit power allocated to the second target band. Therefore, the transmit power allocated by the network device to the second target band can match a transmit power requirement for executing a service on the second target band, so that utilization of the transmit power allocated to the second target band is improved, and a waste of transmit power resources caused by transmit power not being used by the second target band is avoided. In this way, use efficiency of the transmit power is further improved.

Based on the first aspect of the embodiments of this aspect, in an optional implementation of the first aspect of the embodiments of this aspect, the determining a first target band within coverage of a network device includes: determining that a network standard of the first target band is TDD, and that the current resource location is in an uplink scheduling period of the first target band.

Specifically, when the network standard of the first target band is TDD, and the current resource location is within the uplink scheduling period of the first target band, it indicates that the first target band is at the current resource location, and the network device does not need to send downlink data to the terminal device through a downlink. Further, it can be learned that transmit power does not need to be used on the first target band at the current resource location. In this case, the network device may determine to allocate the transmit power of the first target band that is in the uplink scheduling period to the second target band. In this way, there is not unused transmit power in the first target band, to avoid a waste of the transmit power.

Based on the first aspect of the embodiments of this aspect, in an optional implementation of the first aspect of the embodiments of this aspect, a network standard of the second target band is FDD, and the allocating, to a second target band, at least a part of the transmit power allocated to the first target band includes: determining transmit power allocated to the first target band at a previous resource location, where the previous resource location is a resource location before the current resource location, and the previous resource location is in a downlink scheduling period of the first target band; and allocating, to the second target band, at least the part of the transmit power allocated to the first target band.

According to the method shown in this aspect, when the network standard of the first target band is TDD, and the current resource location is in the uplink scheduling period of the first target band, the network device may allocate the transmit power to the second target band at the current resource location based on the transmit power allocated to the first target band at the previous resource location, so that transmit power of each band within the coverage of the network device is dynamically allocated.

Based on the first aspect of the embodiments of this aspect, in an optional implementation of the first aspect of the embodiments of this aspect, after the allocating, to the second target band, at least the part of the transmit power allocated to the first target band, the method further includes: if a latter resource location is in the downlink scheduling period of the first target band, reducing the transmit power allocated to the second target band.

According to the method shown in this aspect, when the network standard of the first target band is TDD, and the latter resource location is located in the downlink scheduling period of the first target band, it indicates that at the latter resource location, the first target band needs transmit power for executing a service. In this case, the network device may reduce the transmit power allocated to the second target band, to dynamically allocate the transmit power to each band within the coverage of the network device.

Based on the first aspect of the embodiments of this aspect, in an optional implementation of the first aspect of the embodiments of this aspect, after the reducing the transmit power allocated to the second target band, the method further includes: allocating, to the first target band, transmit power that is a decrease of the transmit power of the second target band.

By using the method shown in this aspect, transmit power of each band within the coverage of the network device can be dynamically allocated, so that the transmit power allocated to each band matches a corresponding requirement of an executed service.

Based on the first aspect of the embodiments of this aspect, in an optional implementation of the first aspect of the embodiments of this aspect, after the allocating, to a second target band, at least a part of the transmit power allocated to the first target band, the method further includes: scheduling the mid-far point user by using the second target band, or enabling transmit power for scheduling a user by using the second target band to be greater than transmit power for scheduling the user by using the first target band.

By using the method shown in this aspect, the network device may perform corresponding user scheduling based on a status of the transmit power allocated to each band within the coverage of the network device. To be specific, when the transmit power allocated to the second target band is increased, the network device may enable the second target band to be used for scheduling the mid-far point user, or enable the transmit power for scheduling the user by using the second target band to be greater than the transmit power for scheduling the user by using the first target band, to improve efficiency of scheduling the user, where scheduling the user specifically refers to scheduling the mid-far point user and/or scheduling the near point user.

Based on the first aspect of the embodiments of this aspect, in an optional implementation of the first aspect of the embodiments of this aspect, after the allocating, to a second target band, at least a part of the transmit power allocated to the first target band, the method further includes: scheduling the near point user by using the first target band, or enabling transmit power for scheduling a user by using the first target band to be less than transmit power for scheduling the user by using the second target band.

By using the method shown in this aspect, the network device may perform corresponding user scheduling based on a status of the transmit power allocated to each band within the coverage of the network device. To be specific, when the transmit power allocated to the first target band is reduced, the network device may enable the first target band to be used for scheduling the near point user, or enable the transmit power for scheduling the user by using the first target band to be less than the transmit power for scheduling the user by using the second target band, so that a success rate of scheduling the user is improved when transmit power resources are saved as much as possible.

Based on the first aspect of the embodiments of this aspect, in an optional implementation of the first aspect of the embodiments of this aspect, after the allocating, to a second target band, at least a part of the transmit power allocated to the first target band, the method further includes: if it is determined that at the previous resource location, transmit power for scheduling the mid-far point user by using the first target band is greater than transmit power for scheduling the mid-far point user by using the second target band, determining that at the current resource location, transmit power for scheduling the mid-far point user by using the first target band is less than transmit power for scheduling the mid-far point user by using the second target band; or if it is determined that at the previous resource location, transmit power for scheduling the mid-far point user by using the first target band is less than or equal to transmit power for scheduling the mid-far point user by using the second target band, determining that at the current resource location, transmit power for scheduling the mid-far point user by using the first target band is greater than or equal to transmit power for scheduling the mid-far point user by using the second target band.

Based on the first aspect of the embodiments of this aspect, in an optional implementation of the first aspect of the embodiments of this aspect, after the allocating, to a second target band, at least a part of the transmit power allocated to the first target band, the method further includes: if it is determined that at the previous resource location, transmit power for scheduling the near point user by using the first target band is greater than transmit power for scheduling the near point user by using the second target band, determining that at the current resource location, transmit power for scheduling the near point user by using the first target band is less than transmit power for scheduling the near point user by using the second target band; or if it is determined that at the previous resource location, transmit power for scheduling the mid-far point user by using the first target band is less than or equal to transmit power for scheduling the mid-far point user by using the second target band, determining that at the current resource location, transmit power for scheduling the mid-far point user by using the first target band is greater than or equal to transmit power for scheduling the mid-far point user by using the second target band.

By using the method shown in this aspect, the network device may implement, based on a status of scheduling the mid-far point user at the previous resource location by using the first target band and the second target band, allocation of scheduling the mid-far point user at the current resource location by using the first target band and the second target band, to further implement staggered scheduling of the mid-far point user by using the first target band and the second target band. This improves utilization efficiency of the transmit power of each band. In this way, when the transmit power of the network device is limited by the EMF transmit power, the user within the coverage of the network device can be fully scheduled, so that transmit power of a user that can be scheduled by the network device at a same resource location by using different bands is effectively improved.

A second aspect of the embodiments of the present application provides a network device, including:
  a determining unit, configured to determine, at a current resource location, a first target band within coverage of a network device, where transmit power required for executing a service on the first target band is less than transmit power allocated to the first target band, and the first target band is one of a plurality of bands within the coverage of the network device; and an allocation unit, configured to allocate, to a second target band, at least a part of the transmit power allocated to the first target band, where the second target band is a band that is within the coverage of the network device and that is different from the first target band, and at the current resource location, total transmit power allocated within the coverage of the network device is less than or equal to electromagnetic field EMF transmit power of the network device.

The network device shown in this aspect is configured to perform the method shown in the first aspect. For description of a specific execution process and beneficial effects, refer to the foregoing description. Details are not described again.

Based on the second aspect of the embodiments of this aspect, in an optional implementation of the second aspect of the embodiments of this aspect, the current resource location is one of the following:
  at least one radio frame, at least one subframe, at least one slot, or at least one symbol.

Based on the second aspect of the embodiments of this aspect, in an optional implementation of the second aspect of the embodiments of this aspect, the allocation unit is specifically configured to: a value of the transmit power allocated to the second target band is positively correlated with a service parameter of the second target band, where the service parameter includes at least one of the following:
  a service volume, a service type, a user type, and transmit power required for scheduling a mid-far point user or a near point user.

Based on the second aspect of the embodiments of this aspect, in an optional implementation of the second aspect of the embodiments of this aspect, the determining unit is specifically configured to determine that a network standard of the first target band is TDD, and that the current resource location is in an uplink scheduling period of the first target band.

Based on the second aspect of the embodiments of this aspect, in an optional implementation of the second aspect of the embodiments of this aspect, a network standard of the second target band is FDD, and the allocation unit is specifically configured to:
  determine transmit power allocated to the first target band at a previous resource location, where the previous resource location is a resource location before the current resource location, and the previous resource location is in a downlink scheduling period of the first target band; and
  allocate, to the second target band, at least the part of the transmit power allocated to the first target band.

Based on the second aspect of the embodiments of this aspect, in an optional implementation of the second aspect of the embodiments of this aspect, the allocation unit is further configured to:
  if a latter resource location is in the downlink scheduling period of the first target band, reduce the transmit power allocated to the second target band.

Based on the second aspect of the embodiments of this aspect, in an optional implementation of the second aspect of the embodiments of this aspect, the allocation unit is further configured to:
  allocate, to the first target band, transmit power that is a decrease of the transmit power of the second target band.

Based on the second aspect of the embodiments of this aspect, in an optional implementation of the second aspect of the embodiments of this aspect, the network device further includes:
  a scheduling unit, configured to: schedule the mid-far point user by using the second target band, or enable transmit power for scheduling a user by using the second target band to be greater than transmit power for scheduling the user by using the second target band.

Based on the second aspect of the embodiments of this aspect, in an optional implementation of the second aspect of the embodiments of this aspect, the network device further includes:
  a scheduling unit, configured to: schedule the near point user by using the first target band, or enable transmit power for scheduling a user by using the first target band to be less than transmit power for scheduling the user by using the second target band.

Based on the second aspect of the embodiments of this aspect, in an optional implementation of the second aspect of the embodiments of this aspect, the network device further includes:
  a scheduling unit, configured to: if it is determined that at the previous resource location, transmit power for scheduling the mid-far point user by using the first target band is greater than transmit power for scheduling the mid-far point user by using the second target band, determine that at the current resource location, transmit power for scheduling the mid-far point user by using the first target band is less than transmit power for scheduling the mid-far point user by using the second target band; or
  if it is determined that at the previous resource location, transmit power for scheduling the mid-far point user by using the first target band is less than or equal to transmit power for scheduling the mid-far point user by using the second target band, determine that at the current resource location, transmit power for scheduling the mid-far point user by using the first target band is greater than or equal to transmit power for scheduling the mid-far point user by using the second target band.

Based on the second aspect of the embodiments of this aspect, in an optional implementation of the second aspect of the embodiments of this aspect, the network device further includes:

a scheduling unit, configured to: if it is determined that at the previous resource location, transmit power for scheduling the near point user by using the first target band is greater than transmit power for scheduling the near point user by using the second target band, determine that at the current resource location, transmit power for scheduling the near point user by using the first target band is less than transmit power for scheduling the near point user by using the second target band; or if it is determined that at the previous resource location, transmit power for scheduling the mid-far point user by using the first target band is less than or equal to transmit power for scheduling the mid-far point user by using the second target band, determine that at the current resource location, transmit power for scheduling the mid-far point user by using the first target band is greater than or equal to transmit power for scheduling the mid-far point user by using the second target band.

A third aspect of the embodiments of the present application provides a network device, including a processor and a memory. The memory is configured to store a computer program, and the processor is configured to invoke and run the computer program stored in the memory, so that the network device performs the method in the first aspect.

A fourth aspect of the embodiments of the present application provides a computer-readable storage medium. The computer-readable storage medium stores computer instructions. When the computer instructions are run on a computer, the computer is enabled to perform the method in the first aspect.

A fifth aspect of the embodiments of the present application provides a chip, including a processor. The processor is configured to read and execute the computer program stored in the memory, to perform the method shown in the first aspect.

Optionally, the chip further includes a memory, and the processor is connected to the memory through a circuit or a wire.

Optionally, the chip further includes a communication interface.

A sixth aspect of the embodiments of the present application provides a computer program product. The computer program product includes computer program code. When the computer program code is run on a computer, the computer is enabled to perform the method shown in the first aspect.

DESCRIPTION OF EMBODIMENTS

Figure 1:
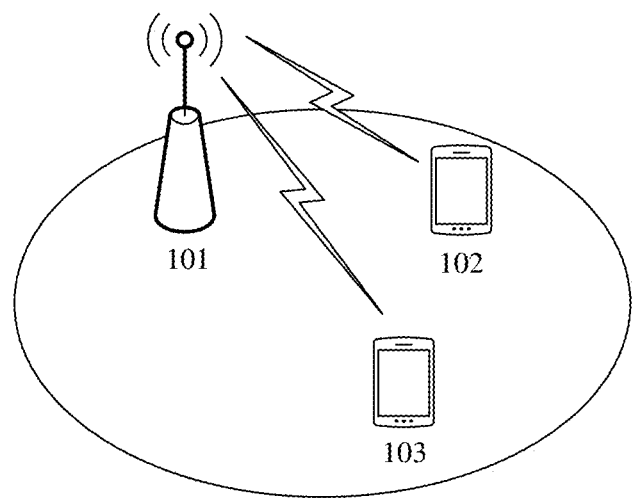
FIG. 1 is a schematic diagram of a structure of an embodiment of a communication system according to the present application.

Embodiments of this application provide a transmit power allocation method that is based on an electromagnetic field, to improve utilization efficiency of transmit power of a band deployed or to be deployed by a network device. To better understand the method shown in the embodiments, the following first describes an example of a communication system to which the method shown in the embodiments is applied.

A specific system type of a communication system is not limited in the embodiments, for example, a long term evolution (LTE) system, a long term evolution advanced pro (LTE-A pro) system, a frequency division duplex (FDD) system, a time division duplex (TDD) system, a universal mobile telecommunication system (UMTS), a worldwide interoperability for microwave access (WiMAX) communication system, a new radio (NR) system, a future communication system, and the like.

The terminal device in the embodiments of this application may also be referred to as user equipment, an access terminal, a subscriber unit, a subscriber station, a mobile station, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), or the like. This is not limited in the embodiments of this application.

In this embodiment of this application, the network device may be any device having a wireless transceiver function. The network device includes but is not limited to an evolved NodeB (eNB), a radio network controller (RNC), a NodeB (NB), a base station controller (BSC), a base transceiver station (BTS), a home NodeB (HNB), a multimedia broadcast multicast service (MBMS) base station, a baseband unit (BBU), an access point (AP) in a wireless fidelity (Wi-Fi) system, a wireless relay node, a wireless backhaul node, a transmission point (TP) or a TRP), and the like, may be a gNB or a transmission point (TRP or TP) in a fifth generation (5G) system, one antenna panel or a group of antenna panels (including a plurality of antenna panels) of a base station in a 5G system, or may be a network node, for example, a baseband unit (BBU) or a distributed unit (DU), that constitutes a gNB or a transmission point.

In some deployments, the gNB may include a central unit (CU) and a distributed unit (DU). The gNB may further include an active antenna unit (AAU). The CU implements a part of functions of the gNB, and the DU implements a part of functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. The AAU implements a part of physical layer processing functions, radio frequency processing, and a function related to an active antenna. Information at the RRC layer eventually becomes information at the PHY layer, or is changed from information at the PHY layer. Therefore, in this architecture, higher layer signaling such as RRC layer signaling may also be considered as being sent by the DU or sent by the DU and the AAU.

It may be understood that the network device may be a device including one or more of the CU, the DU, and the AAU. In addition, the CU may be classified into a network device in a radio access network (RAN), or may be classified into a network device in a core network (CN). This is not limited in this application.

FIG. 1 is an architectural diagram of a communication system according to an embodiment of this application. FIG. 1 is applicable to an embodiment of this application. As shown in FIG. 1, the communication system may include at least one network device 101. The network device 101 and one or more terminal devices (for example, a terminal device 102 and a terminal device 103 shown in FIG. 1) perform communication by using a wireless communication technology. In downlink transmission, the network device is a transmit end, and the terminal device is a receive end. In uplink transmission, the terminal device is a transmit end, and the network device is a receive end.

It should be understood that, FIG. 1 merely shows an example, and the communication system may include one or more network devices and one or more terminal devices. This is not limited herein.

Figure 2:
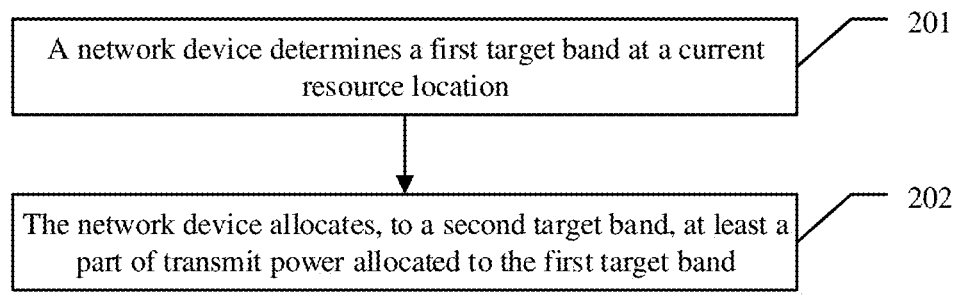
FIG. 2 is a flowchart of steps of an embodiment of a transmit power allocation method that is based on an electromagnetic field according to the present application.

Based on the communication system shown in FIG. 1, the following uses an example to describe a specific execution procedure of a transmit power allocation method that is based on an electromagnetic field according to this embodiment with reference to FIG. 2.

Step 201: A network device determines a first target band at a current resource location.

The following first uses an example to describe a process in which the network device determines the current resource location.

A specific time length of the current resource location determined by the network device is not limited in this embodiment. For example, the current resource location may be one or more consecutive radio frames, one or more consecutive subframes, one or more consecutive slots, or one or more consecutive symbols. It should be clear that, a shorter time length of the current resource location determined by the network device indicates more accurate transmit power allocated to each band within coverage of the network device, in other words, a smaller difference between a value of the transmit power allocated to the band and a value of transmit power required for executing a service on the band.

Optionally, the network device may set a detection periodicity, and the network device may select the current resource location within duration of the detection periodicity. An example in which the current resource location is one symbol is used for description in this embodiment.

The following describes the first target band.

Specifically, the first target band determined by the network device is one of a plurality of bands within the coverage of the network device. A specific standard type of the first target band is not limited in this embodiment. For example, a network standard of the first target band may be FDD or TDD. The FDD may be LTE FDD, third generation (3G) FDD, fourth generation (4G) FDD, or fifth generation (5G) FDD. The TDD may be LTE TDD, 3G TDD, 4G TDD, or 5G TDD. A specific quantity of bands deployed within the coverage of the network device and a network standard of each band are not limited in this embodiment. For example, the first target band may be FDD. For another example, the first target band may be TDD.

More specifically, the first target band determined by the network device in this embodiment meets a first constraint condition that P1 is less than PM, where P1 is transmit power required for executing a service on the first target band, and PM refers to transmit power allocated to the first target band.

It can be learned that, because the first target band meets the first constraint condition that P1 is less than PM, when the service is executed on the first target band, there is still remaining transmit power. For example, the remaining transmit power is PM−P1. It can be learned that, the service may be executed on the first target band when the transmit power PM allocated to the first target band is not exhausted.

Step 202: The network device allocates, to a second target band, at least a part of the transmit power allocated to the first target band.

A specific network standard type and a specific quantity of the second target band are not limited in this embodiment. For example, there may be one or more second target bands. Specifically, the second target band is a band that is within the coverage of the network device and that is different from the first target band. For example, the second target band is a band deployed within the coverage of the network device. For another example, the second target band is a band that meets a second constraint condition, where the second constraint condition means that P2 is greater than PN, P2 is transmit power required for executing a service on the second target band, and PN refers to transmit power allocated to the second target band. For another example, the second target band is a band to be deployed within the coverage of the network device.

Specifically, for example, if the network standard of the first target band is TDD, the second target band may be FDD. For another example, if both the first target band and the second target band are FDD, the first target band may be LTE FDD, and the second target band may be 4G FDD.

When the network device determines the first target band, the network device may allocate, to one or more second target bands, at least the part of transmit power allocated to the first target band. For example, the network device may allocate entire transmit power of the first target band to the one or more second target bands. For another example, the network device may allocate the remaining transmit power of the first target band to the one or more second target bands.

After the network device in this embodiment reallocates transmit power to all determined first target bands within the coverage of the network device, the following conditions further need to be met.
Condition 1

If the service needs to be executed on the first target band at the current resource location, unallocated transmit power of the first target band is greater than or equal to the transmit power required for executing the service on the first target band. It can be learned that, after the network device in this embodiment allocates at least the part of the transmit power of the first target band to the second target band, the unallocated transmit power of the first target band is greater than or equal to the transmit power required for executing the service on the first target band. Therefore, the service can be normally executed on the first target band by using the transmit power not allocated by the network device.
Condition 2

At the current resource location, total transmit power allocated within the coverage of the network device is less than or equal to EMF transmit power of the network device. It can be learned that when the condition 2 is met, the total transmit power allocated by the network device to all the bands within the coverage is less than or equal to the EMF transmit power.

For example, if the coverage of the network device includes one first target band and first second target band, at the current resource location, a sum of transmit power reallocated by the network device to the first target band and transmit power reallocated by the network device to the second target band is less than or equal to the EMF transmit power of the network device.

Figures 3A, 3B:
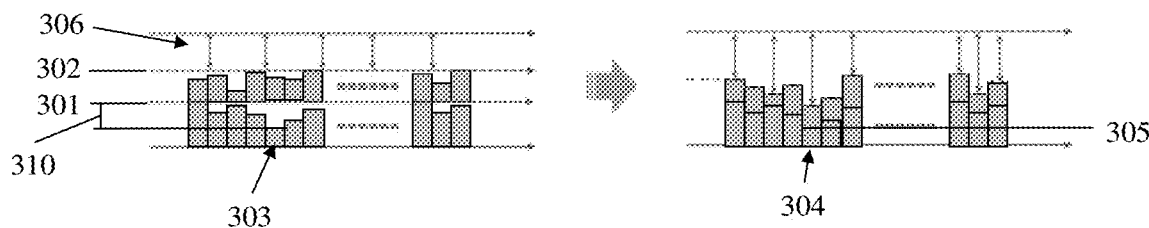
FIG. 3a and FIG. 3b are a schematic diagram of a combination of a transmit power allocation method provided in a conventional technology and a transmit power allocation method provided in the present application.

To better understand advantages of the transmit power allocation method shown in this embodiment, the following uses an example for description with reference to FIG. 3a and FIG. 3b.

FIG. 3 includes FIG. 3a and FIG. 3b. FIG. 3a is an example diagram of allocating transmit power in a conventional technology, and FIG. 3b is an example diagram of allocating transmit power by using the method shown in this embodiment. A horizontal coordinate of a coordinate system in FIG. 3a and FIG. 3b is duration of each symbol, and a vertical coordinate is a value of transmit power.

As shown in FIG. 3a, in a solution in the conventional technology, an example in which a first target band and a second target band are deployed within coverage of a network device is used. The network device pre-allocates first transmit power 301 to the first target band, and pre-allocates second transmit power 302 to the second target band. At each symbol, transmit power used by the first target band needs to be less than or equal to the first transmit power 301, and transmit power used by the second target band needs to be less than or equal to the second transmit power 302.

For example, as shown in a symbol 303, it can be learned that the transmit power used by the first target band is less than the first transmit power 301, in other words, at the symbol 303, after a service is executed on the first target band, there is relatively large remaining transmit power, such as remaining transmit power 310 shown in FIG. 3a. It can be learned that, at the symbol 303, the remaining transmit power is not used by the first target band, resulting in a waste of the remaining transmit power.

Still refer to FIG. 3a. The transmit power used by the second target band is also less than the second transmit power 302, in other words, at the symbol 303, after a service is executed on the second target band, there is relatively large remaining transmit power. It can be learned that, in both the first target band and the second target band, there is unused remaining transmit power. Consequently, a waste of transmit power within the coverage of the network device is caused, transmit power resource utilization within the coverage of the network device is reduced, and a value of total transmit power transmitted by the network device is reduced. In this way, the coverage of the network device is affected.

As shown in FIG. 3b, according to the method shown in this embodiment, at a current resource location 304, transmit power required for executing a service on a first target band is third transmit power 305. A network device allocates transmit power to the first target band based on the transmit power required for executing the service on the first target band, and allocates transmit power to a second target band based on transmit power 305 required for executing a service on the second target band, so that at each resource location, a value of transmit power allocated to each band within coverage of the network device is dynamically adjusted. As shown in FIG. 3b, the network device may allocate, at the current resource location 304, remaining transmit power of the first target band to the second target band for use. Therefore, when the value of the transmit power allocated to each band within the coverage of the network device matches transmit power required for executing a service on the band, a sum of the transmit power allocated by the network device to the bands can also be ensured to be less than or equal to EMF transmit power.

In the method shown in this embodiment, transmit power can be allocated at each resource location based on a transmit power requirement of any band within the coverage of the network device, to implement refined allocation of transmit power to each band in the method shown in this embodiment, so that there is not unused remaining transmit power on the band. In this way, transmit power resource utilization within the coverage of the network device is effectively improved, a value of transmit power actually used by the network device is effectively increased, and the coverage of the network device is improved.

To better understand the transmit power allocation method provided in this application, the following further describes a specific execution process of a transmit power allocation method based on an EMF according to this application with reference to a specific application scenario.

First, a scenario to which the method shown in this embodiment is applied is described.

In this scenario, the network device allocates the transmit power of each band within the coverage of the network device under a limitation of the EMF transmit power.

The international telecommunication union (international telecommunication union, ITU) defines three types of application scenarios for 5G and a future mobile communication system: enhanced mobile broadband (eMBB), ultra-reliable and low latency communications (URLLC), and massive machine-type communications (mMTC).

Typical URLLC services include wireless control in an industrial manufacturing or production process, motion control and remote repair of unmanned vehicles and unmanned aircrafts, a tactile interaction application such as remote surgery, and the like. These services are mainly characterized by ultra-high reliability, low latency, a relatively small data transmission amount, and bursting. Typical mMTC services include automatic intelligent power distribution, a smart city, and the like, and are mainly characterized by a large quantity of networking devices, a relatively small data transmission amount, and insensitivity of data to a transmission latency. These mMTC terminals need to meet requirements for low costs and very long standby time. Typical eMBB services include an ultra-high-definition video, augmented reality (AR), virtual reality (VR), and the like. These services are mainly characterized by a large data transmission amount and a very high transmission rate.

Figure 4:
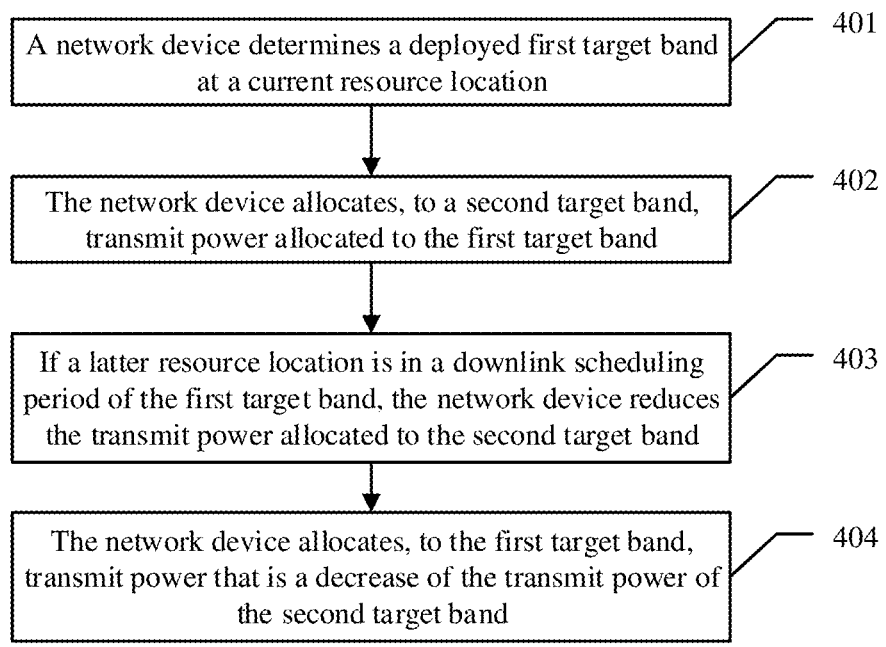
FIG. 4 is a flowchart of steps of another embodiment of a transmit power allocation method that is based on an electromagnetic field according to the present application.

With an increasingly extensive application range of 5G, applications of deploying a 5G band within the coverage of the network device become more extensive. The following describes an execution procedure shown in this embodiment with reference to FIG. 4.

Step 401: A network device determines a deployed first target band at a current resource location.

The network device in this embodiment may determine a 5G band that meets a preset condition as the first target band, where the preset condition is that a network standard of the 5G band is TDD, and the current resource location is located in an uplink scheduling period of the 5G band.

Specifically, when the 5G band meets the preset condition, the network device does not need to send downlink data to a terminal device through a downlink at the current resource location of the 5G band. It can be further learned that transmit power does not need to be used at the current resource location of the 5G band.

It should be clear that, in this embodiment, an example in which the first target band is the 5G band and the network standard is TDD is used for description. This is not limited. In this embodiment, provided that the network standard of the determined first target band is TDD, and the foregoing preset condition is met, a band can be used as the first target band.

For a specific performing process of step 401 shown in this embodiment, refer to step 201 shown in FIG. 2. The specific performing process is not described in this embodiment.

Step 402: The network device allocates, to a second target band, transmit power allocated to the first target band.

In this embodiment, the second target band may be a band that is deployed by the network device and that is different from the first target band. Optionally, the second target band may be 4G FDD1 and 4G FDD2. FDD1 and FDD2 are bands that cover different power ranges. A specific manner in which the network device allocates transmit power to the second target band shown in this embodiment is described below as an example.

The second target band determined by the network device may be FDD1 and FDD2 deployed by the network device, and the network device may allocate at least a part of transmit power of the 5G band to FDD1 and/or FDD2. A specific allocation manner may be as follows.

First, the network device may determine transmit power allocated to the 5G band at a previous resource location. The previous resource location is a resource location before the current resource location, and the previous resource location is in a downlink scheduling period of the 5G band.

Then, the network device allocates, to FDD1 and/or FDD2, at least the part of the transmit power allocated to the 5G band.

Figure 5:
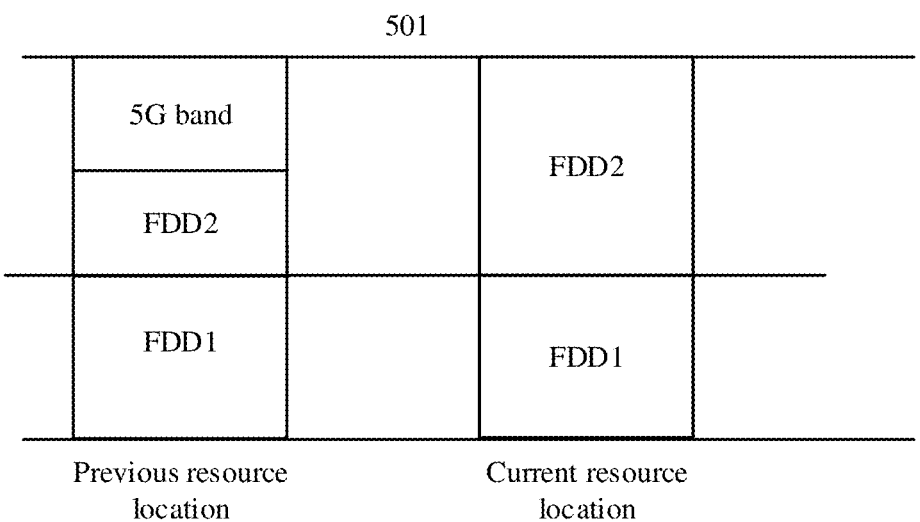
FIG. 5 is an example diagram of a scenario of a transmit power allocation method according to the present application.

For example, refer to FIG. 5. Because the network device determines that the transmit power is not needed in the downlink scheduling period of the 5G band, the network device may allocate, to FDD2, all the transmit power allocated to the 5G band at the previous resource location. In addition, it is ensured that a sum of the transmit power allocated to FDD2 and the transmit power allocated to FDD1 is under a limitation of EMF transmit power 501 of the network device. Optionally, the network device may also allocate all the transmit power allocated to the 5G band at the previous resource location to FDD1. This is not specifically limited in this embodiment.

Figure 6:
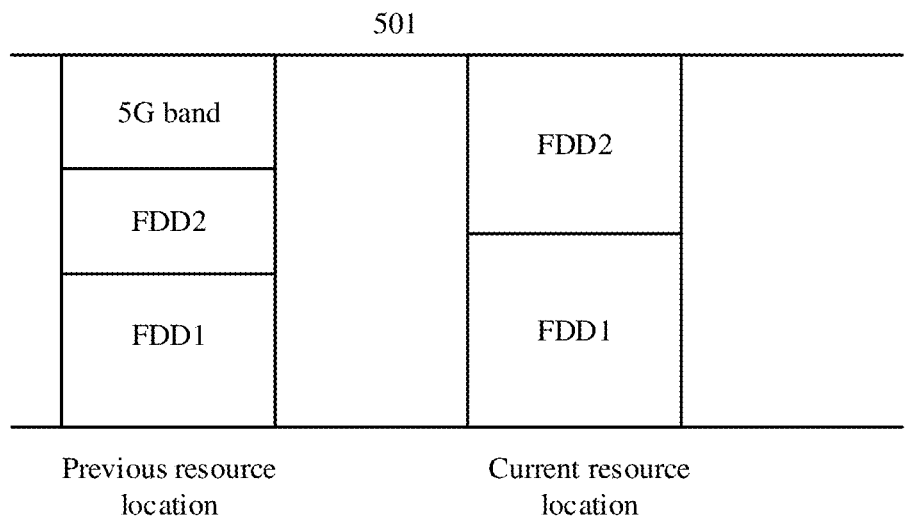
FIG. 6 is an example diagram of another scenario of a transmit power allocation method according to the present application.

For another example, refer to FIG. 6. The network device may allocate a part of the transmit power allocated to the 5G band at the previous resource location to FDD1, and allocate the other part to FDD2.

The following optionally describes how the network device specifically determines a value of the transmit power allocated to FDD1 and a value of the transmit power allocated to FDD2.

In this embodiment, the value of the transmit power allocated by the network device to FDD1 is positively correlated with a service parameter of FDD1, and the value of the transmit power allocated by the network device to FDD2 is also positively correlated with a service parameter of FDD2. The service parameter is at least one of the following:

a service volume, a service type, a user type, and transmit power required for scheduling a mid-far point user or a near point user.

The mid-far point user refers to a user that is relatively far from the network device. For example, coverage of the network device is a circle, and the mid-far point user may refer to a user whose distance from the network device is greater than ½ of a radius of the coverage of the network device. The near point user refers to a user that is relatively close to the network device. For example, the near point user may refer to a user whose distance from the network device is less than or equal to ½ of the radius of the coverage of the network device.

The following describes, with reference to a specific example, how the network device allocates the transmit power to the second target band based on the service parameter.

For example, if at the current resource location, a service volume of a service executed on FDD1 is greater than a service volume of a service executed on FDD2, in the transmit power allocated to the 5G band, the transmit power allocated by the network device to FDD1 is greater than the transmit power allocated by the network device to FDD2.

For another example, if at the current resource location, transmit power required by FDD2 to schedule the mid-far point user is greater than transmit power required by FDD1 to schedule the mid-far point user, in the allocated transmit power of the 5G band, the transmit power allocated by the network device to FDD2 is greater than the transmit power allocated by the network device to FDD1.

For another example, the network device may preset priority indication information, where the priority indication information is used to indicate a service type. If the network device determines that a service executed on FDD2 is the same as the service type indicated by the priority indication information, in the allocated transmit power of the 5G band, the transmit power allocated by the network device to FDD2 is greater than the transmit power allocated by the network device to FDD1.

For another example, the network device may preset user type indication information, where the user type indication information is used to indicate a user type. If the network device determines that a user type of a user to be scheduled on FDD1 is the same as the user type indicated by the user type indication information, in the allocated transmit power of the 5G band, the transmit power allocated by the network device to FDD1 is greater than the transmit power allocated by the network device to FDD2.

Step 403: If a latter resource location is in a downlink scheduling period of the first target band, the network device reduces the transmit power allocated to the second target band.

In this embodiment, if the network device detects that the latter resource location is located in the downlink scheduling period of the 5G band, where the latter resource location is a resource location after the current resource location, when the network device determines that at the latter resource location, transmit power is required for sending downlink data on the 5G band, the network device reduces the transmit power allocated to FDD1 and/or FDD2.

Step 404: The network device allocates, to the first target band, transmit power that is a decrease of the transmit power of the second target band.

To enable the 5G band to implement service execution at the latter resource location, the network device may determine transmit power required for service execution on the 5G band at the latter resource location, and the network device may allocate the transmit power allocated to FDD1 and/or FDD2 to the 5G band based on a value of the transmit power required for service execution on the 5G band, so that the transmit power of the 5G band can meet a service execution requirement at the latter resource location.

Figure 7:
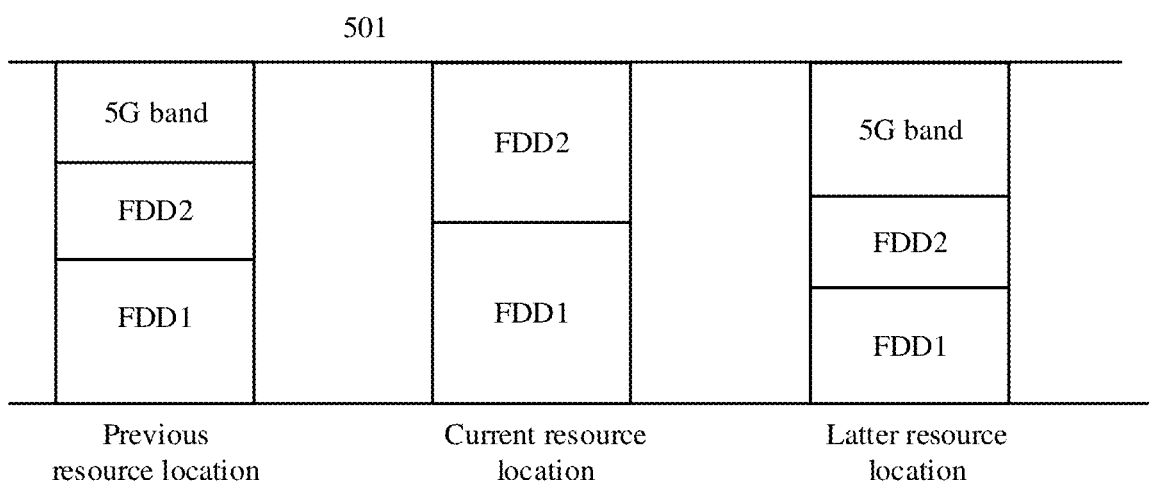
FIG. 7 is an example diagram of another scenario of a transmit power allocation method according to the present application.

FIG. 7 is used as an example. The network device allocates, at the current resource location, the transmit power of the 5G band at the previous resource location to FDD1 and FDD2. When at the latter resource location, the network device determines that the 5G band is in the downlink scheduling period, the network device needs to reduce transmit power for FDD1 and/or FDD2, and allocate a decrease of the transmit power to the 5G band. As shown in FIG. 7, an example in which the transmit power for FDD1 and the transmit power for FDD2 are reduced, and the decreases in the transmit power are both allocated to the 5G band is used for description. It can be learned that, as shown in this step, the transmit power allocated to the 5G band can meet a service execution requirement.

Optionally, the network device may also determine, based on a service parameter of the 5G band, a specific value of the transmit power allocated to the 5G band. For specific description of the service parameter, refer to the foregoing description. Details are not described again.

By using the method shown in this embodiment, when it is determined that the network standard of the 5G band that is used as the first target band is TDD, and the current resource location is located in the uplink scheduling period of the 5G band, it indicates that at the current resource location, the allocated transmit power does not need to be used on the first target band. To avoid a waste of the transmit power, the network device may allocate the transmit power allocated to the 5G band to another band within the coverage of the network device. This effectively avoids a waste of the transmit power on the first target band, improves transmit power usage of the network device, and improves the coverage of the network device.

Figure 8:
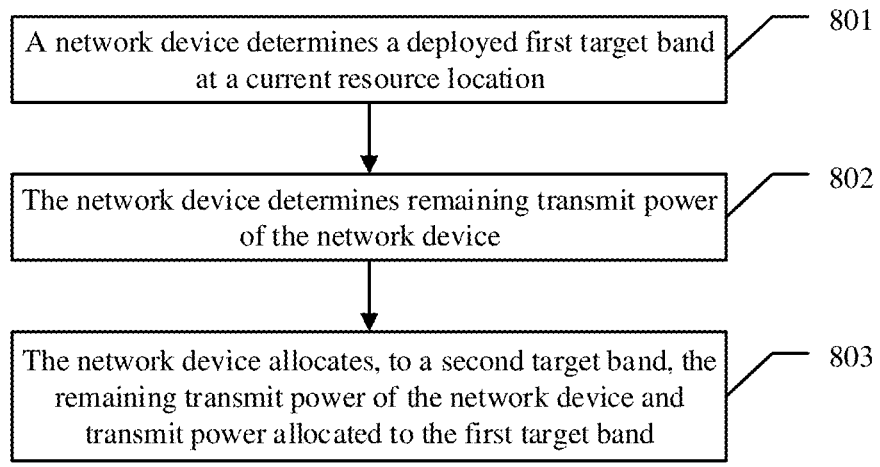
FIG. 8 is a flowchart of steps of another embodiment of a transmit power allocation method that is based on an electromagnetic field according to the present application.

With reference to FIG. 8, a process of deploying a new band within coverage of a network device is described below as an example. Specifically, in this application scenario, an example in which a band deployed within the coverage of the network device is a 5G band is used for description.

Step 801: The network device determines deployed first target bands at a current resource location.

For a specific performing process of step 801 shown in this embodiment, refer to step 201 shown in FIG. 2. The specific performing process is not described in this embodiment. In this application scenario, an example in which the network device determines that both FDD1 and FDD2 are the first target bands is used for description. It should be noted that description of a quantity and network standards of the first target bands in this embodiment is an example, and constitutes no limitation.

Step 802: The network device determines remaining transmit power of the network device.

Figure 9:
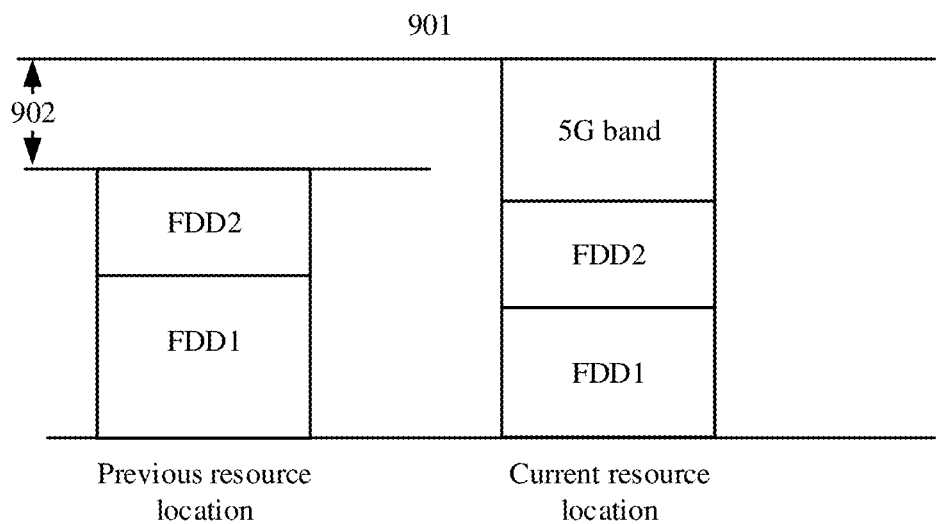
FIG. 9 is an example diagram of another scenario of a transmit power allocation method according to the present application.

Refer to FIG. 9. First, the network device determines EMF transmit power 901 of the network device.

Then, the network device determines, at a previous resource location, transmit power allocated to FDD1 and FDD2 that are used as the first target bands.

Finally, the network device determines that remaining transmit power 902 of the network device is a difference between the EMF transmit power 901 of the network device and P-FDD1 and P-FDD2, that is, the remaining transmit power 902 of the network device=the EMF transmit power 901 of the network device—P-FDD1-P-FDD2.

Step 803: The network device allocates, to a second target band, the remaining transmit power of the network device and transmit power allocated to the first target band.

In this embodiment, to deploy a new second target band within the coverage of the network device, a value of transmit power allocated to the newly deployed second target band needs to be determined. In this embodiment, an example in which the second target band is a 5G band to be deployed to the network device is used for description.

In this embodiment, when the second band needs to be deployed within the coverage of the network device, the network device may allocate the remaining transmit power 902 of the network device to the second target band, and further allocate at least a part of the transmit power of FDD1 and/or at least a part of the transmit power of FDD2 to the second target band.

In this embodiment, an example in which the network device allocates the remaining transmit power 902 of the network device, at least the part of the transmit power of FDD1, and at least the part of the transmit power of FDD2 to the 5G band that is used as the second target band is used for description.

Optionally, a specific value of the transmit power that is allocated to the second target band and that is determined by the network device may be determined based on a service parameter of the second target band. For specific description of the service parameter, refer to the foregoing description. Details are not described again.

For description of beneficial effects of using the method shown in this embodiment, still refer to FIG. 3a and FIG. 3b. When a 5G band 306 needs to be deployed within the coverage of the network device, in the solution in the conventional technology shown in FIG. 3a, a value of transmit power that can be allocated to the 5G band is fixed. Specifically, the EMF transmit power of the network device is P_MAX, the transmit power allocated to the first target band FDD1 is P_FDD1, and the transmit power allocated to the first target band FDD2 is P_FDD2. In this case, the transmit power that can be allocated to the 5G band P_NR=P_MAX−P_TDD−P_FDD. If P_NR is less than transmit power required by the network device to deploy the 5G band to execute a service, coverage of the 5G band is affected.

However, in the solution shown in FIG. 3b in this embodiment, when the network device allocates the remaining transmit power of the network device to the 5G band at the current resource location, at least the part of the transmit power of FDD1 and FDD2 may be further allocated to the 5G band. The current resource location 304 shown in FIG. 3b is used as an example. When the network device allocates the remaining transmit power of the network device to the 5G band, and allocates at least the part of the transmit power of FDD1 and FDD2 to the 5G band, a value of transmit power that can be allocated to the 5G band can be effectively increased, and a value of transmit power allocated to the newly deployed 5G band of the network device can be effectively increased, so that the coverage of the 5G band is effectively improved while an EMF transmit power requirement of the network device is met.

Figure 10:
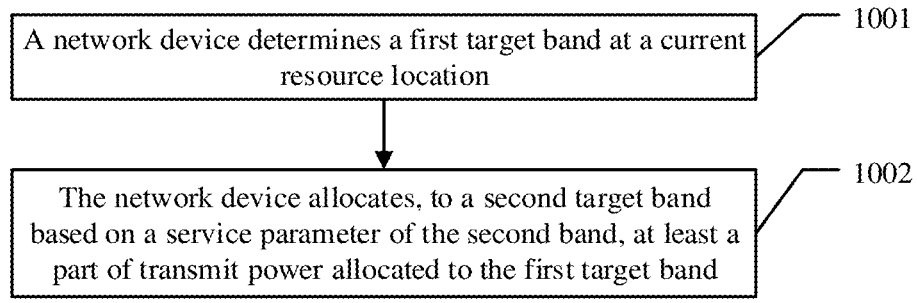
FIG. 10 is a flowchart of steps of another embodiment of a transmit power allocation method that is based on an electromagnetic field according to the present application.

Another embodiment of the method shown in this embodiment is described below as an example based on FIG. 10. A scenario to which this embodiment is applied is that a network device can dynamically adjust, at a current resource location, a value of transmit power of each band deployed by the network device. Therefore, utilization of transmit power of the network device is effectively improved.

Step 1001: The network device determines a first target band at the current resource location.

In this embodiment, an example in which the first target band determined by the network device is FDD1 is used for description. For a specific execution process, refer to step 201 shown in FIG. 2. Details are not described again.

Step 1002: The network device allocates, to a second target band based on a service parameter of the second band, at least a part of transmit power allocated to the first target band.

Specifically, when the network device in this embodiment determines the first target band, the network device may obtain the service parameter of the second target band, and determine, based on a value of the service parameter, a value of the transmit power allocated to the second target band. For specific description of the service parameter, refer to FIG. 4. Details are not described again in this embodiment.

In this embodiment, for description of a condition that needs to be met for allocating the transmit power to the second target band by the network device, refer to FIG. 2. Details are not described again.

It can be learned that, by using the method shown in this embodiment, the network device can dynamically adjust, at the current resource location, a value of the transmit power allocated to the first target band and the value of the transmit power allocated to the second target band, so that there is no waste of remaining transmit power in the first target band, and utilization efficiency of the transmit power of the network device is improved.

Figure 11:
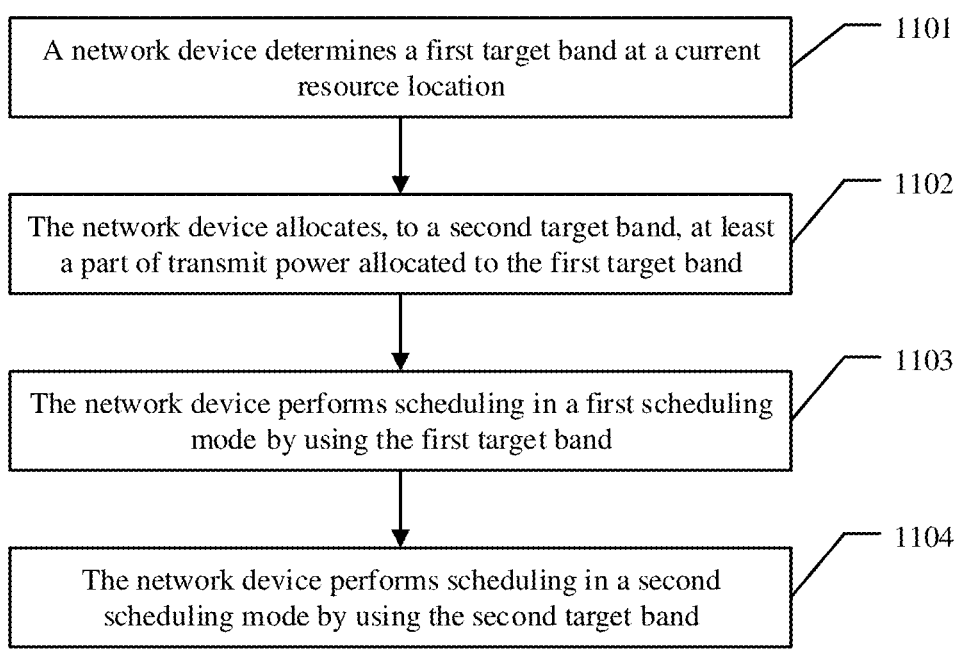
FIG. 11 is a flowchart of steps of another embodiment of a transmit power allocation method that is based on an electromagnetic field according to the present application.

Based on the foregoing method, allocation of transmit power of each band within the coverage of the network device is implemented. With reference to FIG. 11, the following describes an example of a specific execution procedure of another embodiment of the method shown in this embodiment. By using the method shown in this embodiment, a user can be scheduled on each band. For details, refer to the following steps.

Step 1101: The network device determines a first target band at a current resource location.

Step 1102: The network device allocates, to a second target band, at least a part of transmit power allocated to the first target band.

For a specific execution process of step 1101 and step 1102 shown in this embodiment, refer to step 201 and step 202 shown in FIG. 2. Details are not described again.

Step 1103: The network device performs scheduling in a first scheduling mode by using the first target band.

It can be learned from the foregoing embodiment that, at the current resource location, the network device has allocated at least the part of the transmit power of the first target band to the second target band, that is, the network device reduces allocation of the transmit power to the first target band. In this case, the network device may perform scheduling in the first scheduling mode by using the first target band, where the first scheduling mode means that the network device schedules a near point user by using the first target band, or enables transmit power for scheduling a user by using the first target band to be less than transmit power for scheduling the user by using the second target band. Scheduling the user specifically refers to scheduling the near point user and/or scheduling the mid-far point user. For specific description of the near point user and the mid-far point user, refer to the foregoing embodiment, and details are not described again in this embodiment.

Specifically, in this embodiment, because the network device reduces allocation of the transmit power to the first target band, it can be learned that, at the current resource location, to effectively schedule the user on the first target band whose transmit power is reduced, the first target band may be scheduled in the first scheduling mode, so that efficiency of using the transmit power of the first target band for user scheduling is improved, and a success rate for user scheduling is effectively improved.

Step 1104: The network device performs scheduling in a second scheduling mode by using the second target band.

It can be learned from the foregoing embodiment that, because the network device has allocated at least the part of the transmit power of the first target band to the second target band, that is, the network device increases allocation of the transmit power to the second target band, the network device may perform scheduling in the second scheduling mode by using the second target band, where the second scheduling mode means that the network device schedules a mid-far point user by using the second target band, or enables transmit power for scheduling a user by using the second target band to be greater than transmit power for scheduling the user by using the first target band.

Specifically, because the network device increases allocation of the transmit power to the second target band, the second target band may be scheduled in the second scheduling mode, so that efficiency of using the transmit power of the second target band for user scheduling is improved, and a success rate for user scheduling is further improved.

A time sequence of performing step 1103 and step 1104 shown in this embodiment is not limited.

Figure 12:
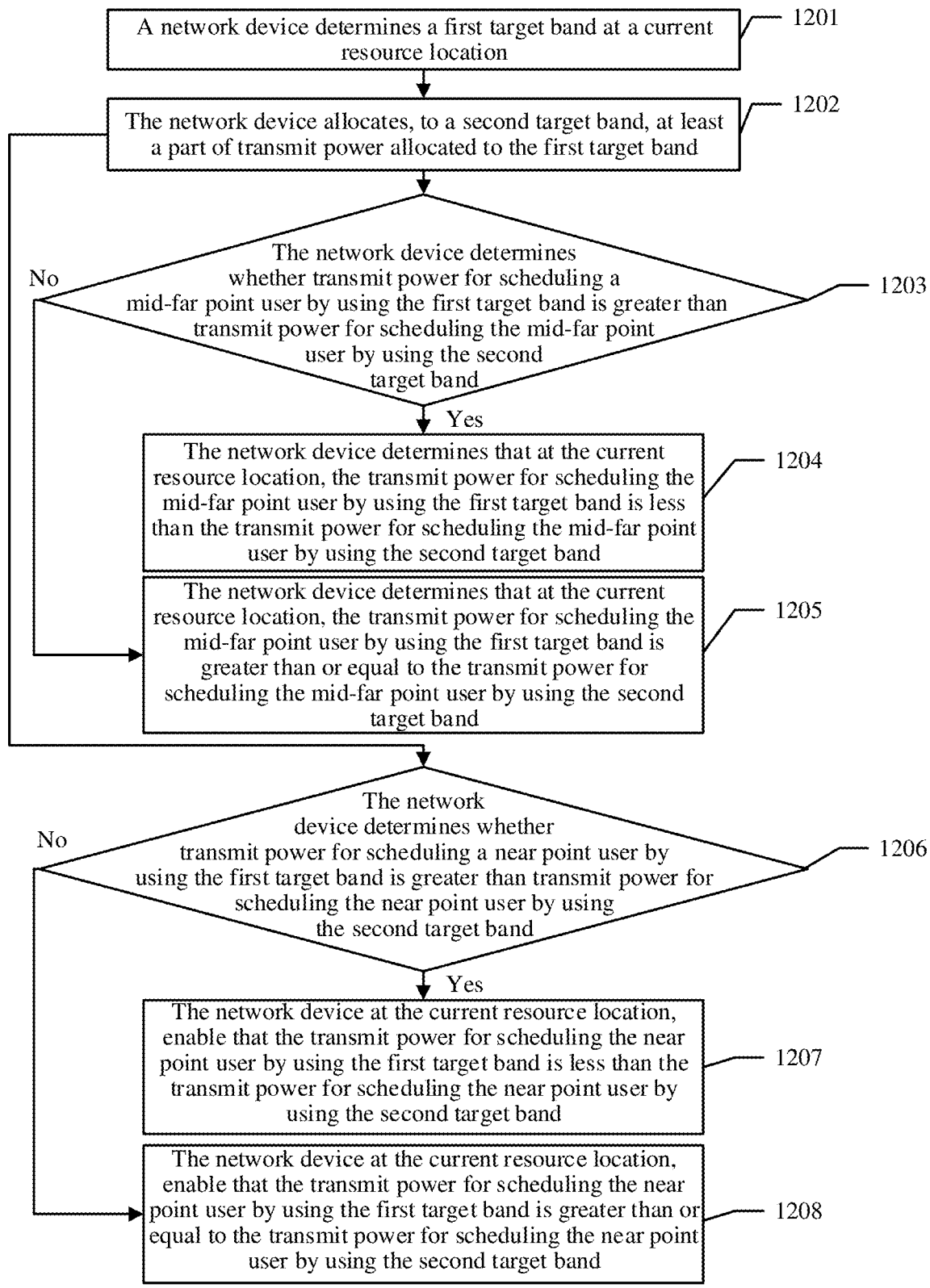
FIG. 12 is a flowchart of steps of another embodiment of a transmit power allocation method that is based on an electromagnetic field according to the present application.

In description about the embodiment shown in FIG. 11, the network device schedules a user based on a value of transmit power of each band. With reference to FIG. 12, the following describes how to implement staggered scheduling to improve utilization efficiency of the transmit power of each band, to maximize utilization of a power resource of the network device.

Step 1201: The network device determines a first target band at a current resource location.

Step 1202: The network device allocates, to a second target band, at least a part of transmit power allocated to the first target band.

For a specific execution process of step 1201 and step 1202 shown in this embodiment, refer to step 201 and step 202 shown in FIG. 2. Details are not described again.

Step 1203: The network device determines whether at a previous resource location, transmit power for scheduling a mid-far point user by using the first target band is greater than transmit power for scheduling the mid-far point user by using the second target band. If the transmit power for scheduling the mid-far point user by using the first target band is greater than the transmit power for scheduling the mid-far point user by using the second target band, perform step 1204. If the transmit power for scheduling the mid-far point user by using the first target band is less than or equal to the transmit power for scheduling the mid-far point user by using the second target band, perform step 1205.

In this embodiment, to implement staggered scheduling for the mid-far point user, the network device determines whether at the previous resource location, the transmit power for scheduling the mid-far point user by using the first target band is greater than the transmit power for scheduling the mid-far point user by using the second target band, and then further determines a status of scheduling the mid-far point user at the current resource location based on a status of scheduling the mid-far point user at the previous resource location.

Step 1204: The network device determines that at the current resource location, the transmit power for scheduling the mid-far point user by using the first target band is less than the transmit power for scheduling the mid-far point user by using the second target band.

It can be learned that, by using the method shown in this embodiment, if at the previous resource location, the transmit power for scheduling the mid-far point user by using the first target band is greater than the transmit power for scheduling the mid-far point user by using the second target band, at the current resource location, the transmit power for scheduling the mid-far point user by using the first target band is less than the transmit power for scheduling the mid-far point user by using the second target band, so that the network device implements staggered scheduling for the mid-far point user by using the first target band and the second target band.

Step 1205: The network device determines that at the current resource location, the transmit power for scheduling the mid-far point user by using the first target band is greater than or equal to the transmit power for scheduling the mid-far point user by using the second target band.

It can be learned that, if at the previous resource location, the transmit power for scheduling the mid-far point user by using the first target band is less than or equal to the transmit power for scheduling the mid-far point user by using the second target band, at the current resource location, the transmit power for scheduling the mid-far point user by using the first target band is greater than or equal to the transmit power for scheduling the mid-far point user by using the second target band, so that the network device implements staggered scheduling for the mid-far point user by using the first target band and the second target band.

Step 1206: The network device determines whether at a previous resource location, transmit power for scheduling a near point user by using the first target band is greater than transmit power for scheduling a near point user by using the second target band. If the transmit power for scheduling the near point user by using the first target band is greater than the transmit power for scheduling the near point user by using the second target band, perform step 1207. If the transmit power for scheduling the near point user by using the first target band is less than or equal to the transmit power for scheduling the near point user by using the second target band, perform step 1208.

In this embodiment, to implement staggered scheduling for the near point user, the network device determines whether at the previous resource location, the transmit power for scheduling the near point user by using the first target band is greater than the transmit power for scheduling the near point user by using the second target band, and then further determines a status of scheduling the near point user at the current resource location based on a status of scheduling the near point user at the previous resource location.

It should be noted that there is no limitation on an execution sequence of step 1203 and step 1206 in this embodiment. Optionally, the network device may selectively perform step 1203 or step 1206. If the network device needs to perform step 1206, step 1206 can be performed after step 1202 in an execution sequence.

Step 1207: The network device at the current resource location, enable that the transmit power for scheduling the near point user by using the first target band is less than the transmit power for scheduling the near point user by using the second target band.

When the network device determines that at the previous resource location, the transmit power for scheduling the near point user by using the first target band is greater than the transmit power for scheduling the near point user by using the second target band, the network device may at the current resource location, enable that the transmit power for scheduling the near point user by using the first target band is less than the transmit power for scheduling the near point user by using the second target band.

Step 1208: The network device at the current resource location, enable that the transmit power for scheduling the near point user by using the first target band is greater than or equal to the transmit power for scheduling the near point user by using the second target band.

When the network device determines that at the previous resource location, the transmit power for scheduling the near point user by using the first target band is less than or equal to the transmit power for scheduling the near point user by using the second target band, the network device may at the current resource location, enable that the transmit power for scheduling the near point user by using the first target band is less than the transmit power for scheduling the near point user by using the second target band.

It can be learned that, by using the method shown in this embodiment, the network device can implement staggered scheduling for the mid-far point user and/or the near point user at the current resource location, so that the utilization efficiency of the transmit power of each band is improved. In this way, when transmit power of the network device is limited by EMF transmit power, a user within coverage of the network device can be fully scheduled, so that a quantity of users that can be scheduled by the network device at a same resource location by using different bands can be effectively increased.

Figure 13:
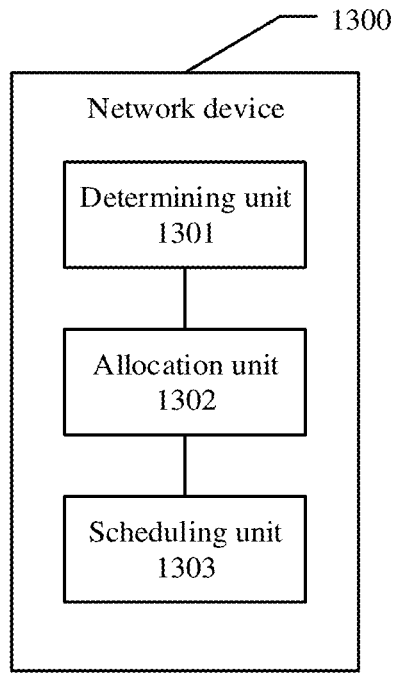
FIG. 13 is a schematic diagram of a structure of an embodiment of a network device according to the present application.

With reference to FIG. 13, the following describes, from a perspective of a functional module, a specific structure of a network device provided in this embodiment as an example. The network device shown in this embodiment is configured to perform the method shown in any one of the foregoing method embodiments. For a specific execution process, refer to the foregoing description. Details are not described again.

The network device 1300 specifically includes:

a determining unit 1301, configured to determine, at a current resource location, a first target band within coverage of the network device, where transmit power required for executing a service on the first target band is less than transmit power allocated to the first target band, and the first target band is one of a plurality of bands within the coverage of the network device; and an allocation unit 1302, configured to allocate, to a second target band, at least a part of the transmit power allocated to the first target band, where the second target band is a band that is within the coverage of the network device and that is different from the first target band, and at the current resource location, total transmit power allocated within the coverage of the network device is less than or equal to electromagnetic field EMF transmit power of the network device.

Optionally, the current resource location is one of the following:

at least one radio frame, at least one subframe, at least one slot, or at least one symbol.

Optionally, the allocation unit 1302 is specifically configured to: a value of the transmit power allocated to the second target band is positively correlated with a service parameter of the second target band, where the service parameter includes at least one of the following:

a service volume, a service type, a user type, and transmit power required for scheduling a mid-far point user or a near point user.

Optionally, the determining unit 1301 is specifically configured to determine that a network standard of the first target band is TDD, and that the current resource location is in an uplink scheduling period of the first target band.

Optionally, if a network standard of the second target band is FDD, the allocation unit 1302 is specifically configured to determine transmit power allocated to the first target band at a previous resource location, where the previous resource location is a resource location before the current resource location, and the previous resource location is in a downlink scheduling period of the first target band; and further configured to allocate at least a part of the transmit power allocated to the first target band to the second target band.

Optionally, the allocation unit 1302 is further configured to:

if a latter resource location is in the downlink scheduling period of the first target band, reduce the transmit power allocated to the second target band.

Optionally, the allocation unit 1302 is further configured to:

allocate, to the first target band, transmit power that is a decrease of the transmit power of the second target band.

The network device further includes: a scheduling unit 1303, configured to: schedule the mid-far point user by using the second target band, or enable transmit power for scheduling a user by using the second target band to be greater than transmit power for scheduling the near point user by using the first target band.

Optionally, the scheduling unit 1303 is further configured to: schedule the near point user by using the first target band, or enable transmit power for scheduling a user by using the first target band to be less than transmit power for scheduling the user by using the second target band.

Optionally, the scheduling unit 1303 is further configured to: if it is determined that at the previous resource location, transmit power for scheduling the mid-far point user by using the first target band is greater than transmit power for scheduling the mid-far point user by using the second target band, determine that at the current resource location, transmit power for scheduling the mid-far point user by using the first target band is less than transmit power for scheduling the mid-far point user by using the second target band; or if it is determined that at the previous resource location, transmit power for scheduling the mid-far point user by using the first target band is less than or equal to transmit power for scheduling the mid-far point user by using the second target band, determine that at the current resource location, transmit power for scheduling the mid-far point user by using the first target band is greater than or equal to transmit power for scheduling the mid-far point user by using the second target band.

Optionally, the scheduling unit 1303 is further configured to: if it is determined that at the previous resource location, transmit power for scheduling the near point user by using the first target band is greater than transmit power for scheduling the near point user by using the second target band, determine that at the current resource location, transmit power for scheduling the near point user by using the first target band is less than transmit power for scheduling the near point user by using the second target band; or if it is determined that at the previous resource location, transmit power for scheduling the mid-far point user by using the first target band is less than or equal to transmit power for scheduling the mid-far point user by using the second target band, determine that at the current resource location, transmit power for scheduling the mid-far point user by using the first target band is greater than or equal to transmit power for scheduling the mid-far point user by using the second target band.

Figure 14:
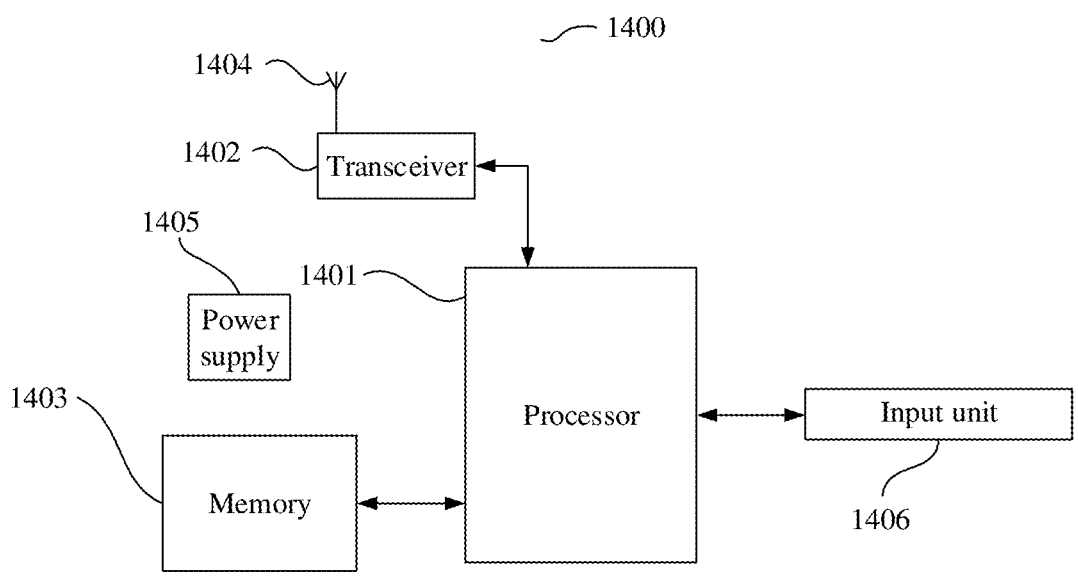
FIG. 14 is a schematic diagram of a structure of an embodiment of a network device according to the present application.

In addition, this application further provides a network device. With reference to FIG. 14, the following describes a specific structure of the network device from a perspective of physical hardware.

FIG. 14 is a schematic diagram of a structure of a network device according to an embodiment of this application. As shown in FIG. 14, the network device 1400 includes a processor 1401, a transceiver 1402, and a memory 1403. The processor 1401, the transceiver 1402, and the memory 1403 may communicate with each other through an internal connection path, to transfer a control signal and/or a data signal. The memory 1403 is configured to store a computer program, and the processor 1401 is configured to invoke the computer program from the memory 1403 and run the computer program, to control the transceiver 1402 to receive and send a signal. Optionally, the network device 1400 may further include an antenna 1404. The transceiver 1402 transmits or receives a radio signal by using an antenna.

Optionally, the processor 1401 and the memory 1403 may be combined into a processing apparatus, and the processor 1401 is configured to execute program code stored in the memory 1403 to implement the foregoing functions.

Optionally, the memory 1403 may alternatively be integrated into the processor 1401. Alternatively, the memory 1403 is independent of the processor 1401, in other words, is located outside the processor 1401.

The processor 1401 may be configured to perform an action that is implemented internally by the network device and that is described in the foregoing method embodiments. The transceiver 1402 may be configured to perform a receiving or sending action performed by the network device, and the memory 1403 is configured to implement a function of storing.

Optionally, the network device 1400 may further include a power supply 1405, configured to supply power to various devices or circuits in the network device.

In addition, to improve functions of the network device, the network device 1400 may further include an input unit 1406. Optionally, the input unit 1406 may be a signal input interface.

This application further provides a computer-readable storage medium. The computer-readable storage medium stores a computer program. When the computer program is executed by a computer, the computer is enabled to perform an operation and/or processing performed by the network device in any method embodiment.

This application further provides a computer program product. The computer program product includes computer program code. When the computer program code is run on a computer, the computer is enabled to perform an operation and/or processing performed by the network device in any method embodiment.

This application further provides a chip. The chip includes a processor. A memory configured to store a computer program is disposed independent of the chip. The processor is configured to execute the computer program stored in the memory, to perform an operation and/or processing performed by the network device in any method embodiment.

Further, the chip may further include a memory and/or a communication interface. The communication interface may be an input/output interface, an input/output circuit, or the like.

The processor mentioned in the foregoing embodiments may be an integrated circuit chip, and has a signal processing capability. In an implementation process, steps in the foregoing method embodiments can be completed by using a hardware integrated logic circuit in the processor, or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the methods disclosed in the embodiments of this application may be directly executed and completed by using a hardware encoding processor, or may be executed and completed by using a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor.

A person of ordinary skill in the art may be aware that, in combination with units and algorithm steps in the examples described in the embodiments disclosed in this specification, the embodiments may be implemented by electronic hardware or a combination of computer software and electronic hardware. This specifically depends on specific applications and design constraints of the technical solutions. A person skilled in the art may use different methods to implement the described functions for each particular application, but it should not be considered that the implementation goes beyond the scope of this application.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely specific implementations in this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmit power allocation method, comprising:
   determining, at a current resource location, a first target band within coverage of a network device, wherein a transmit power for executing a service on the first target band is less than a transmit power allocated to the first target band, and the first target band is one of a plurality of bands within the coverage of the network device; and
   allocating, to a second target band, at least a part of the transmit power allocated to the first target band, wherein the second target band is within the coverage of the network device and different from the first target band, and at the current resource location, a total transmit power allocated within the coverage of the network device is less than or equal to an electromagnetic field (EMF) transmit power of the network device.

2. The method according to claim 1, wherein
   a value of the transmit power allocated to the second target band is positively correlated with a service parameter of the second target band, wherein the service parameter comprises at least one of the following: a service volume, a service type, a user type, or a transmit power for scheduling a mid-far point user or a near point user.

3. The method according to claim 1, wherein determining the first target band within the coverage of the network device comprises:
   determining that a network standard of the first target band is time division duplex (TDD); and
   determining that the current resource location is in an uplink scheduling period of the first target band.

4. The method according to claim 3, wherein a network standard of the second target band is frequency division duplex (FDD), and allocating, to the second target band, at least the part of the transmit power allocated to the first target band comprises:
   determining a transmit power allocated to the first target band at a previous resource location, wherein the previous resource location is a resource location before the current resource
   determining the previous resource location is in a downlink scheduling period of the first target band; and
   allocating, to the second target band, at least the part of the transmit power allocated to the first target band based on the determination that the previous resource location is in the downlink scheduling period of first target band.

5. The method according to claim 4, wherein after allocating, to the second target band, at least the part of the transmit power allocated to the first target band, the method further comprises:
   in response to a latter resource location being in the downlink scheduling period of the first target band, reducing the transmit power allocated to the second target band; and
   allocating, to the first target band, a transmit power that corresponds to a decrease of the transmit power allocated to the second target band.

6. The method according to claim 1, wherein after allocating, to the second target band, at least the part of the transmit power allocated to the first target band, the method further comprises:
   scheduling a mid-far point user by using the second target band; or
   enabling a transmit power for scheduling the mid-far point user by using the second target band to be greater than a transmit power for scheduling the mid-far point user by using the first target band.

7. The method according to claim 1, wherein after allocating, to the second target band, at least the part of the transmit power allocated to the first target band, the method further comprises:
   scheduling a near point user by using the first target band; or
   enabling a transmit power for scheduling the near point user by using the first target band to be less than a transmit power for scheduling the near point user by using the second target band.

8. The method according to claim 1, wherein after allocating, to the second target band, at least the part of the transmit power allocated to the first target band, the method further comprises:
   in response to a determination that at a previous resource location, a transmit power for scheduling a mid-far point user by using the first target band is greater than a transmit power for scheduling the mid-far point user by using the second target band, determining that at the current resource location, a transmit power for scheduling the mid-far point user by using the first target band is less than a transmit power for scheduling the mid-far point user by using the second target band; or
   in response to a determination that at the previous resource location, the transmit power for scheduling the mid-far point user by using the first target band is less than or equal to the transmit power for scheduling the mid-far point user by using the second target band, determining that at the current resource location, the transmit power for scheduling the mid-far point user by using the first target band is greater than or equal to the transmit power for scheduling the mid-far point user by using the second target band.

9. The method according to claim 1, wherein after allocating, to the second target band, at least the part of the transmit power allocated to the first target band, the method further comprises:
   in response to a determination that at a previous resource location, a transmit power for scheduling a near point user by using the first target band is greater than a transmit power for scheduling the near point user by using the second target band, determining that at the current resource location, a transmit power for scheduling the near point user by using the first target band is less than a transmit power for scheduling the near point user by using the second target band; or
   in response to a determination that at the previous resource location, a transmit power for scheduling a mid-far point user by using the first target band is less than or equal to a transmit power for scheduling the mid-far point user by using the second target band, determining that at the current resource location, a transmit power for scheduling the mid-far point user by using the first target band is greater than or equal to a transmit power for scheduling the mid-far point user by using the second target band.

10. The method according to claim 1, wherein allocating, to the second target band, at least the part of the transmit power allocated to the first target band comprises:
    allocating an entirety of the transmit power of allocated to the first target band to one or more of the second target bands; or
    allocating a remainder of the transmit power allocated to the first target band to the one or more second target bands.

11. A network device, comprising:
    a processor; and
    a memory having instructions stored thereon that, when executed by the processor, cause the network device to:
    determine, at a current resource location, a first target band within coverage of the network device, wherein a transmit power for executing a service on the first target band is less than a transmit power allocated to the first target band, and the first target band is one of a plurality of bands within the coverage of the network device; and
    allocate, to a second target band, at least a part of the transmit power allocated to the first target band, wherein the second target band is within the coverage of the network device and different from the first target band, and at the current resource location, a total transmit power allocated within the coverage of the network device is less than or equal to an electromagnetic field (EMF) transmit power of the network device.

12. The network device according to claim 11, wherein the network device is further caused to:
  determine that a network standard of the first target band is time division duplex (TDD); and
  determine that the current resource location is in an uplink scheduling period of the first target band.

13. The network device according to claim 12, wherein a network standard of the second target band is frequency division duplex (FDD), and the network device is further caused to:
  determine a transmit power allocated to the first target band at a previous resource location, wherein the previous resource location is a resource location before the current resource
  determine the previous resource location is in a downlink scheduling period of the first target band; and
  allocate, to the second target band, at least the part of the transmit power allocated to the first target band based on the determination that the previous resource location is in the downlink scheduling period of first target band.

14. The network device according to claim 13, wherein after the network device is caused to allocate, to the second target band, at least the part of the transmit power allocated to the first target band, the network device is further caused to:
  in response to a latter resource location being in the downlink scheduling period of the first target reduce the transmit power allocated to the second target band; and
  allocate, to the first target band, a transmit power that corresponds to a decrease of the transmit power allocated to the second target band.

15. The network device according to claim 11, wherein after the network device is caused to allocate, to the second target band, at least the part of the transmit power allocated to the first target band, the network device is further caused to:
  schedule a mid-far point user by using the second target band; or
  enable a transmit power for scheduling the mid-far point user by using the second target band to be greater than a transmit power for scheduling the mid-far point user by using the first target band.

16. The network device according to claim 11, wherein after the network device is caused to allocate, to the second target band, at least the part of the transmit power allocated to the first target band, the network device is further caused to:
  schedule a near point user by using the first target band; or
  enable a transmit power for scheduling the near point user by using the first target band to be less than a transmit power for scheduling the near point user by using the second target band.

17. The network device according to claim 11, wherein after the network device is caused to allocate, to the second target band, at least the part of the transmit power allocated to the first target band, the network device is further caused to:
  in response to a determination that at a previous resource location, a transmit power for scheduling a mid-far point user by using the first target band is greater than a transmit power for scheduling the mid-far point user by using the second target band, determine that at the current resource location, a transmit power for scheduling the mid-far point user by using the first target band is less than a transmit power for scheduling the mid-far point user by using the second target band; or
  in response to a determination that at the previous resource location, the transmit power for scheduling the mid-far point user by using the first target band is less than or equal to the transmit power for scheduling the mid-far point user by using the second target band, determine that at the current resource location, the transmit power for scheduling the mid-far point user by using the first target band is greater than or equal to the transmit power for scheduling the mid-far point user by using the second target band.

18. The network device according to claim 11, wherein after the network device is caused to allocate, to the second target band, at least the part of the transmit power allocated to the first target band, the network device is further caused to:
  in response to a determination that at a previous resource location, a transmit power for scheduling a near point user by using the first target band is greater than a transmit power for scheduling the near point user by using the second target band, determine that at the current resource location, a transmit power for scheduling the near point user by using the first target band is less than a transmit power for scheduling the near point user by using the second target band; or
  in response to a determination that at the previous resource location, a transmit power for scheduling a mid-far point user by using the first target band is less than or equal to a transmit power for scheduling the mid-far point user by using the second target band, determine that at the current resource location, a transmit power for scheduling the mid-far point user by using the first target band is greater than or equal to a transmit power for scheduling the mid-far point user by using the second target band.

19. The network device according to claim 11, wherein the network device is caused to allocate, to the second target band, at least the part of the transmit power allocated to the first target band by:
  allocating an entirety of the transmit power allocated to the first target band to one or more of the second target bands; or
  allocating a remainder of the transmit power allocated to the first target band to the one or more second target bands.

20. A non-transitory computer-readable storage medium having instructions stored thereon that, when executed by a processor, cause a network device to:
  determine, at a current resource location, a first target band within coverage of the network device, wherein a transmit power for executing a service on the first target band is less than a transmit power allocated to the first target band, and the first target band is one of a plurality of bands within the coverage of the network device; and
  allocate, to a second target band, at least a part of the transmit power allocated to the first target band, wherein the second target band is within the coverage of the network device and different from the first target band, and at the current resource location, a total transmit power allocated within the coverage of the network device is less than or equal to an electromagnetic field (EMF) transmit power of the network device.

* * * * *